Aug. 22, 1961   F. DIESFELD ET AL   2,996,913
TEST-STAND-BRAKE FOR TESTING THE TORQUE OF MOTORS
Filed Aug. 9, 1957   2 Sheets-Sheet 1
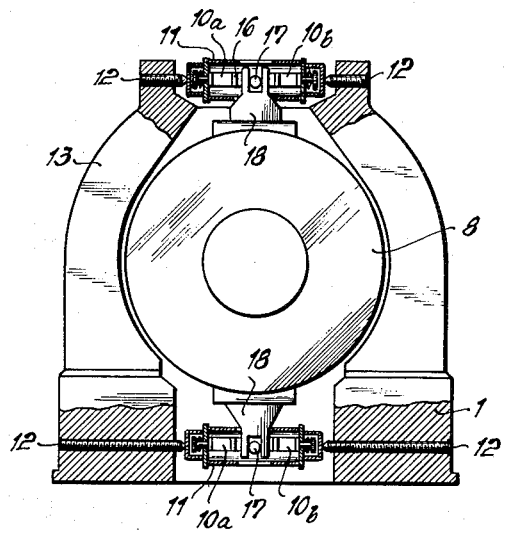
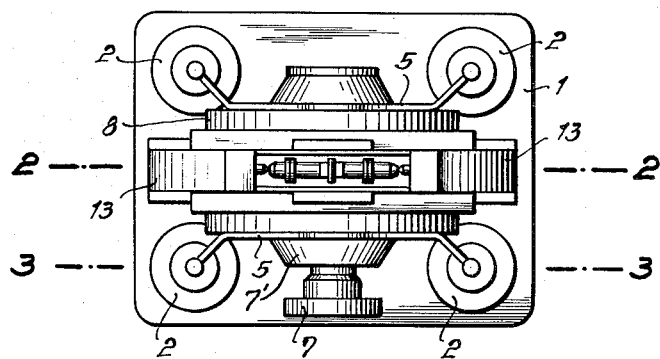
INVENTORS
FRANZ DIESFELD
HEINZ BIELFELDT Aug. 22, 1961     F. DIESFELD ET AL     2,996,913
TEST-STAND-BRAKE FOR TESTING THE TORQUE OF MOTORS
Filed Aug. 9, 1957     2 Sheets-Sheet 2

INVENTORS
FRANZ DIESFELD
HEINZ BIELFELDT 2,996,913
TEST-STAND-BRAKE FOR TESTING THE TORQUE OF MOTORS
Franz Diesfeld, Kiel, and Heinz Bielfeldt, Eckernforde, Germany, assignors to J. P. Sauer & Sohn, Gesellschaft mit beschraenkter Haftung, Eckernforde, Norderschanze, Germany
Filed Aug. 9, 1957, Ser. No. 677,266
5 Claims. (Cl. 73—134)

The present invention relates to a test-stand-brake for testing the torque of motors.

Dynamometrical brakes are known in which the measuring body is supported in pendulum fashion in ball bearings and in which the torque is transmitted by means of an arm to a mechanical balance and recorded there. Mechanical weighing devices have, because of the customary use of pendulums, comparatively large measuring paths, which are necessary because of the transmission of the measured values to a pointer of the indicating instrument. These large measuring paths have the disadvantage that the measurement is affected by the connections between the measuring body and the stationary base plate. In addition, the measuring body must be properly balanced. In case of employing large bearings for the pendulum support, the measurement will be seriously interfered with. Furthermore, as these ball bearings are merely statically stressed, the balls gradually work their way into the outer and inner surfaces. Especially in diesel engines and in two stroke cycle engines this fact becomes noticeable after a comparatively short time.

It is, therefore, one object of the present invention to provide a test-stand-brake which avoids the disadvantages of the known structures.

It is another object of the present invention to provide a test-stand-brake wherein the measuring body is supported in a floating manner, and for the measurement of the torque, torque-transmitters are employed which operate with elongation measuring strips arranged in a compensation measuring bridge, whereby the measuring body acts upon the elongation measuring strips in an expanding or shortening sense. In such construction the mechanical values are converted into electric values, as the elongation of the strips results in a change of resistance. It is possible to employ one or a plurality of pairs of elongation measuring strips displaced with respect to each other. A compensation measuring bridge serves as measuring means of the electric values, the measuring bridge making it possible to measure elongations of $10^{-5}$ (with respect to the length of the carrier of the elongation strips) and permits at any time a readjustment without difficulties and without the requirement of special experience (as compared with a mechanical balance). The measuring values may be gauged directly in "kg" (kilos) and be read off at an indicating instrument. If for example, for the determination of the carrier of the measuring strip $$E_{max} = \frac{\Delta L}{L} = 5 \cdot 10^{-4}$$

is selected (in which formula: E is the change of the length expressed in percentages; $\Delta L$ is the change of the length; L is the total length of the elongation measuring strip) there will result extremely small deflections at the brake stator, which may be regarded as practically non-existent.

It is still another object of the present invention to provide a test-stand-brake which eliminates the disadvantages of the pendulum ball bearing by arranging the brake stator in such a manner that it rests on diaphragms supported on liquid cushions.

It is still a further object of the present invention to further provide the brake stator at its bearing plates with bolts which rest on the diaphragms. The diaphragms close up the hydraulic cylinders at their top ends. For equalizing the liquid levels every two hydraulic cylinders appertaining to the same end plate are in communication with each other by means of pipe connections. The damping effect produced by such arrangement guarantees a steady indication, as the shocks produced by the motors to be tested are absorbed.

Preferably, there are always two carriers of elongation measuring strips united to a pair and accommodated in a common casing, whereby the entire unit forms the torque transmitter. Preferably the casing or housing consists of a sleeve or tubular member, which is secured in position by means of threaded bolts in supports (above), or in the base frame (below). Two carriers of elongation measuring strips may be secured to each other by means of a bow-shaped arm. Arranged in the middle of this bow is a roller which is embraced by a fork-shaped member fastened to the testing body, so that the testing body can transmit its power to the carriers of the elongation measuring strips, and consequently also to the measuring strips. By means of nuts and cup springs, the carriers of the measuring strips, and consequently also the measuring strips, can be pre-tensioned. Preferably the carriers of the elongation measuring strips are pre-tensioned by means of nuts and cup-springs to such an extent that their pre-tensioning exceeds their maximum operating value.

With these and other objects in view which will become apparent in the following detailed description, the present invention will be clearly understood in the following detailed description in connection with the accompanying drawings, in which:

FIGURE 1 is a top plan view of the test-stand-brake;

FIG. 2 is a partial sectional view along the line 2—2 of FIG. 1;

Figure 3:
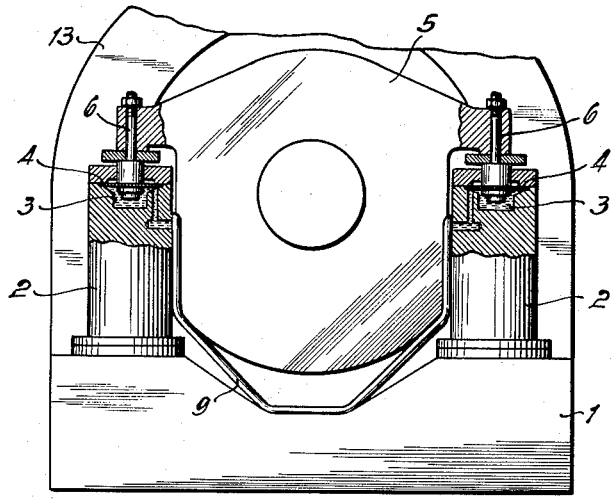
FIG. 3 is a partial sectional view along the line 3—3 of FIG. 1.
Figure 4:
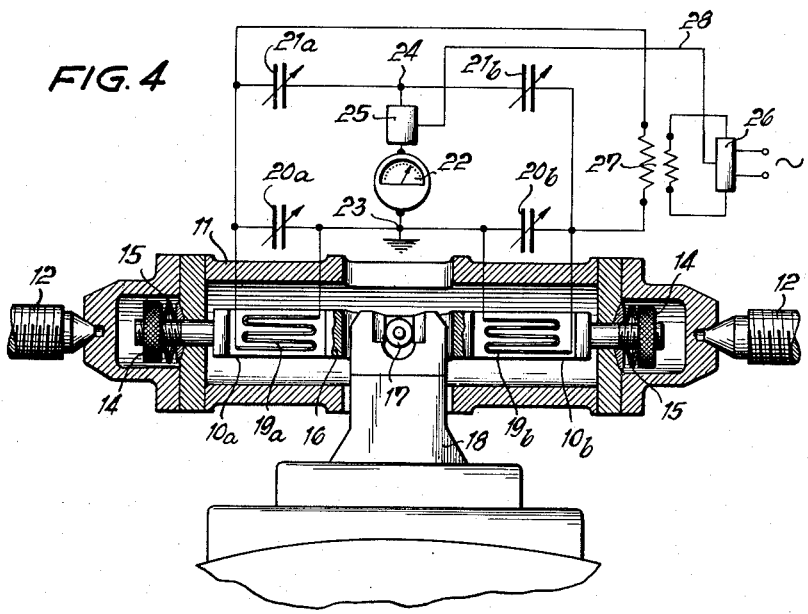
FIG. 4 is a view, partly in section, of the transmitter of the torque and of its supporting means, as well as of the wiring plan.

Referring now to the drawings, four hydraulic cylinders 2 are mounted on a base frame 1, which hydraulic cylinders 2 are closed up at their upper ends by diaphragms 4 supported by liquid cushions 3. On these diaphragms 4 rests with both of its bearing plates 5 the brake stator 8, whereby the bolts 6 are interposed between the diaphragms 4 and the bearing plates 5. The bearing plates 5 are rigidly secured to the brake stator 8 by any suitable conventional means, and the measuring body is connected with the motor to be tested by means of a coupling 7. The liquid cushions 3 of two adjacent cylinders 2 appertaining to the same bearing plate 5 are in communication with each other by means of an equalizing pipe connection 9. Each pair of elongation measuring strips 19a, 19b are arranged on each of their carriers 10a and 10b in sleeves 11, which in their turn are secured in position in the supports 13 (above) and in the base frame 1 (below) by means of threaded bolts 12. The elongation measuring strips 19a, 19b, which are arranged in pairs, are pre-tensioned together with their carriers 10a and 10b, by means of the nuts 14 and the cup springs 15 within the sleeves 11. The carriers 10a and 10b, carrying the elongation measuring strips 19a, 19b, are secured to each other by means of a bow-shaped arm 16 in the center of which a roller 17 is arranged. The roller 17 is embraced by a fork-shaped member 18 secured to the brake stator 8 and applies in accordance with the direction of rotation the torque of the hydraulically supported brake stator 8 to the transmitters of the torque. As stated before, the elongation measuring strips 19a and 19b are arranged on the carriers 10a and 10b, which strips 19a and 19b, are insulated against the sleeves 11 and which are connected in parallel with the variable condensers 20a and 20b. Each of the elongation measuring strips 19a, 19b and one of the variable condensers 20a, 20b, connected in parallel, form an outer bridge-branch of the compensation bridge. Two further variable condensers 21a, 21b form the third and fourth bridge-branch. The indicating instrument 22 is disposed between the connecting point 23 of the two elongation measuring strips 19a, 19b and between the connecting point 24 of the two variable condensers 21a, 21b, an amplifier 25, a strip filter and an annular modulator being connected in series with the indicating instrument 22. The bridge voltage is supplied by an oscillator 26, through high frequency transformer 27. The conduit 28 supplies between the line voltage for the amplifier 25, the strip filter and the annular modulator.

The test-stand-brake of the present invention operates in the following manner: The rotor 7' is coupled to the motor to be tested in known manner by means of the coupling 7. Prior to the testing, the compensation measuring bridge is adjusted by means of the variable condensers 20a, 20b and 21a, 21b in such a manner that the indicating instrument 22 is in zero position. As soon as the motor to be tested starts rotation, the torque is transmitted in known manner to the brake stator 8, which stresses or relieves the elongation measuring strips 19a, 19b by means of the fork-shaped member 18, the rollers 17 and the bow-shaped arm 16. Due to the resulting change of resistance the equilibrium of the compensation measuring bridge is disturbed, so that the indicating instrument 22 has a deflection which corresponds to the value of the torque. Since the change of the length of the elongation measuring strips 19a, 19b ranges within the order of the magnitude of $5.10^{-4}$, no visible angular displacement of the brake stator 8 will occur. For this reason it is not required that the brake stator 8 be mounted in ball bearings or roller bearings permitting a rotary movement. It can be mounted on members less sensitive to shocks, preferably on hydraulic cushions. A pre-charge of the measuring device by the weight of the stator and of the rotor does not take place.

Due to the pre-tensioning afforded the torque transmitters, the damping is very considerable as well as the sensitivity of the measuring system. While mechanical balances become less sensitive with increasing damping, the transmitters of the torque, in accordance with the present invention, retain their sensitivity in spite of high damping. The pre-tensioning has the further result that the brake stator 8 and also the indicator 22 returns reliably to their original or zero position. Consequently the zero position is always constant.

The conversion of the mechanical measuring values into electric measuring values, which can be read off at an indicating instrument, has the further advantage that in dangerous cases the tests with the indicating instrument can be continued indefinitely, while when mechanical measuring instruments are employed, a measuring cabin is required.

While we have disclosed one embodiment of the present invention, it is to be understood that this embodiment is given by example only and not in a limiting sense, the scope of the present invention being determined by the objects and the claims.

I claim:

1. A test-stand-brake for testing torsional forces comprising a base frame, supports projecting upwardly from said base frame, a rotor having coupling means adapted to couple said rotor to a motor to be tested, a brake stator surrounding said rotor, two pairs of liquid cushions supporting said brake stator, means for hydraulically coupling each pair of said liquid cushions, disposed opposite each other in order to transmit pressure between said opposite liquid cushions, an electrical measuring bridge, torque responsive members including filamentary strain responsive resistance elements operatively connected to said brake stator and co-operating with said measuring bridge, said resistance elements converting mechanical changes of said torque responsive members into an electrical value, and an indicating instrument having a deflection responsive to the electrical value of the torque.

2. The test-stand-brake, as set forth in claim 1, wherein each of said torque responsive members comprises two carriers mechanically connected to each other with said filamentary strain responsive resistance elements being disposed on said carriers, a sleeve receiving said carriers, said sleeves being supported by said base frame and said supports, respectively.

3. The test-stand-brake, as set forth in claim 2, which includes a vertical fork-shaped member constituting a torque lever disposed on top and on the bottom of said brake stator, and wherein the means mechanically connecting respective carriers comprises a bow-shaped arm securing a roller disposed in the center of and embraced by said bow-shaped arm, a screw bolt projecting outwardly from each of said carriers, a nut screwed on said screw bolt and a cup spring disposed between said nut and said carriers for pretensioning the latter, and said carriers being mounted in said supports and said base frame, respectively.

4. The test-stand-brake, as set forth in claim 1, wherein each of said torque responsive members comprises two carriers mechanically connected to each other with said filamentary strain responsive resistance elements being disposed on said carriers, a sleeve receiving said carriers, said sleeve being supported by said base frame and said supports, a nut screwed on a projection of said carriers, and a cup spring being disposed between said nut and a cross-member of said sleeve, in order to pretension said filamentary strain responsive resistance elements, said pretension being greater than the maximum of the value to be measured.

5. The test-stand-brake, as set forth in claim 1, which includes hydraulic cylinders mounted on said base frame and adapted to receive a liquid, a diaphragm supported by said liquid cushions and closing said cylinders, two bearing plates spaced apart from each other and rigidly secured to said brake stator, a bolt interposed between each diaphragm and one of said bearing plates.

References Cited in the file of this patent

UNITED STATES PATENTS

| 2,498,995 | Manning | Feb. 28, 1950 |
| 2,563,425 | Schaevitz | Aug. 7, 1951 |
| 2,580,395 | Bellizzi | Jan. 1, 1952 |
| 2,706,799 | Howe et al. | Apr. 19, 1955 |

FOREIGN PATENTS

| 390,904 | Great Britain | Apr. 20, 1933 |